(12) United States Patent
Seren

(10) Patent No.: US 12,091,962 B2
(45) Date of Patent: Sep. 17, 2024

(54) DOWNHOLE LOGGING TOOL

(71) Applicant: SAUDI ARABIAN OIL COMPANY, Dhahran (SA)

(72) Inventor: Huseyin Rahmi Seren, Houston, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 18/392,431

(22) Filed: Dec. 21, 2023

(65) Prior Publication Data
US 2024/0125227 A1    Apr. 18, 2024

Related U.S. Application Data

(63) Continuation of application No. 17/868,569, filed on Jul. 19, 2022.

(51) Int. Cl.
*E21B 47/01* (2012.01)
*E21B 47/26* (2012.01)

(52) U.S. Cl.
CPC .............. *E21B 47/01* (2013.01); *E21B 47/26* (2020.05)

(58) Field of Classification Search
CPC ......... E21B 23/001; E21B 47/00; E21B 47/01
See application file for complete search history.

(56) References Cited

U.S. PATENT DOCUMENTS

| | | | | |
|---|---|---|---|---|
| 7,055,625 | B1* | 6/2006 | Myrick | E21B 49/06 175/58 |
| 7,845,440 | B2* | 12/2010 | Jacobsen | B62D 55/065 901/1 |
| 9,359,841 | B2* | 6/2016 | Hall | E21B 47/13 |
| 10,920,586 | B2* | 2/2021 | Al-Qasim | E21B 47/00 |
| 11,002,093 | B2* | 5/2021 | Bouldin | E21B 23/14 |
| 11,054,536 | B2* | 7/2021 | Jaaskelainen | E21B 47/135 |
| 11,199,639 | B2* | 12/2021 | Morrish | G01V 1/52 |
| 2003/0141078 | A1* | 7/2003 | Mackenzie | E21B 44/005 166/50 |
| 2004/0223410 | A1* | 11/2004 | West | G01V 1/40 181/104 |
| 2006/0102342 | A1* | 5/2006 | East | E21B 47/01 166/250.1 |
| 2009/0271117 | A1* | 10/2009 | Ayoub | G01V 11/002 901/1 |
| 2013/0333872 | A1* | 12/2013 | McMillon | E21B 47/01 166/66.5 |

(Continued)

*Primary Examiner* — Kipp C Wallace
(74) *Attorney, Agent, or Firm* — Osha Bergman Watanabe & Burton LLP

(57) ABSTRACT

An untethered downhole tool includes a first body, a second body, a logging sensor, a motor, and a controller. Each of the first and second bodies includes a housing that defines an inner volume and a magnetic anchor configured, in an active state, to attach the body to a wellbore tubular. The motor is attached to one of the first or second bodies and coupled to a spooler. The controller is communicably coupled to the motor and the first and second magnetic anchors. The controller is configured to adjust one of the first or second magnetic anchors from the active state to an inactive state; and activate the motor to operate the spooler to spool the cable from the spooler to increase a length of a portion of the cable between the spooler and the detached first or second body.

27 Claims, 5 Drawing Sheets

(56) References Cited

U.S. PATENT DOCUMENTS

2016/0215578 A1* 7/2016 Adnan .................... E21B 23/01
2017/0350237 A1* 12/2017 Giem ...................... E21B 47/13
2022/0381119 A1* 12/2022 Ingraham .............. E21B 23/001

* cited by examiner

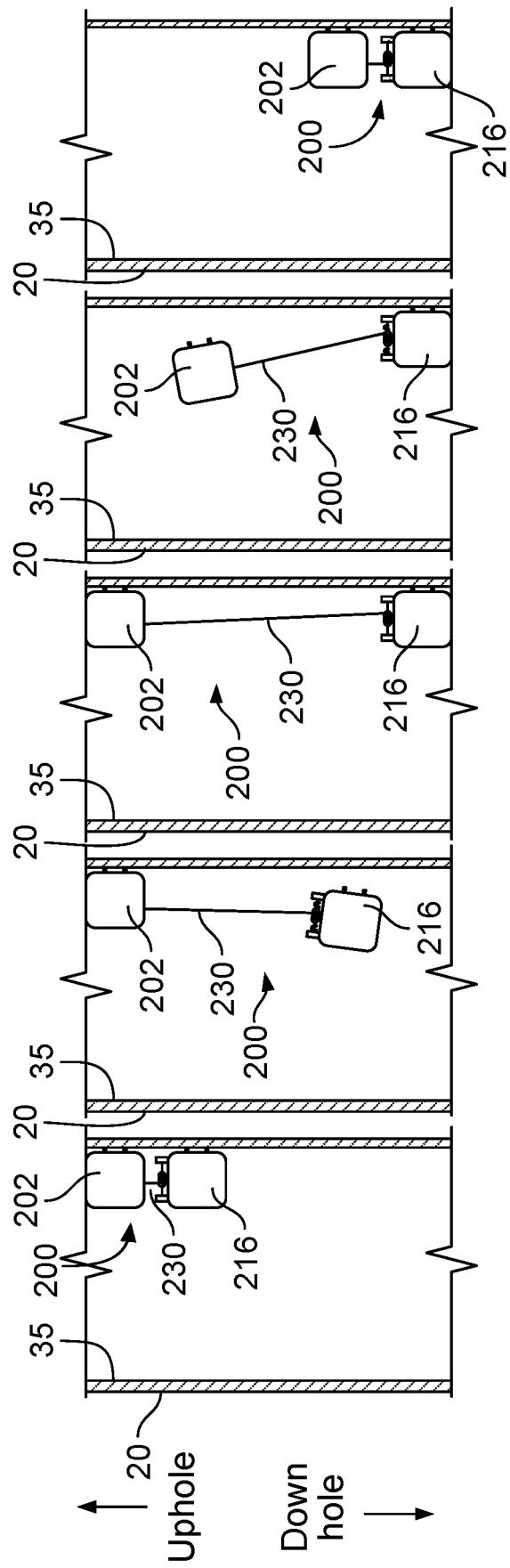

DOWNHOLE LOGGING TOOL

TECHNICAL FIELD

The present disclosure describes a downhole logging tool for a wellbore.

BACKGROUND

Conventionally, wellbores are logged using wireline tools, or permanent sensors such as fiber optic or electronics circuits wired to the surface. These methods can be inefficient in terms of time and cost. Wireline systems have a large footprint due to a need for heavy equipment such as a blowout preventer (BOP), lubricator, winch, and crane. Wireline tools can also need full-time supervision that require a team of field personnel attending hours-long operations at a well site. Permanent sensors can remove these challenges, but it is rarely economical to install permanent sensors into every wellbore. In some instances, an untethered and autonomous downhole tool, such as a logging tool, can be used.

SUMMARY

In an example implementation, an untethered downhole tool includes a first body, a second body, at least one logging sensor, a motor, and at least one controller. The first body includes a first housing that defines a first inner volume, and a first magnetic anchor configured, in an active state, to attach the first body to a wellbore tubular. The second body includes a second housing that defines a second inner volume, and a second magnetic anchor configured, in an active state, to attach the second body to the wellbore tubular. The at least one logging sensor is positioned in or on at least one of the first or second housings. The motor is attached to one of the first or second bodies and coupled to a spooler, and the motor is configured, when activated, to operate the spooler to spool or unspool a cable coupled to the spooler and attached to the other of the first or second bodies. The at least one controller is positioned in at least one of the first or second housings and communicably coupled to the motor and the first and second magnetic anchors. The controller is configured to perform operations including adjusting one of the first or second magnetic anchors from the active state to an inactive state to detach the respective first or second body from the wellbore tubular; and activating the motor to operate the spooler to spool the cable from the spooler to increase a length of a portion of the cable between the spooler and the detached first or second body.

In an aspect combinable with the example implementation, the controller is configured to perform operations further including determining that the length of the portion of the cable is at a predetermined length; and based on the determination, deactivating the motor and adjusting the one of the first or second magnetic anchors from the inactive state to the active state to re-attach the respective first or second body to the wellbore tubular such that the first and second bodies are both attached to the wellbore tubular a distance substantially equal to the predetermined length.

In another aspect combinable with any of the previous aspects, the operation of determining that the length of the portion of the cable is at the predetermined length includes determining a number of revolutions completed by the spooler to spool the cable from the spooler to increase the length of the portion of the cable between the spooler and the detached first or second body; calculating the length of the portion of the cable based on the determined number of revolutions; and comparing the calculated length to the predetermined length.

In another aspect combinable with any of the previous aspects, the controller is configured to perform operations further including adjusting the other of the first or second magnetic anchors from the active state to the inactive state to detach the other of the first or second body from the wellbore tubular; activating the motor to operate the spooler to spool the cable on the spooler to decrease the length of the portion of the cable between the spooler and the detached first or second body; determining that the length of the portion of the cable is at a minimum length; and based on the determination, deactivating the motor and adjusting the other of the first or second magnetic anchors from the inactive state to the active state to re-attach the other of the first or second body to the wellbore tubular such that the first and second bodies are both attached to the wellbore tubular a distance substantially equal to the minimum length.

In another aspect combinable with any of the previous aspects, the controller is configured to perform operations further including identifying logging measurements from the at least one sensor; and storing the identified logging measurements in at least one memory of the controller.

In another aspect combinable with any of the previous aspects, the at least one controller includes a first controller positioned in the first housing; and a second controller positioned in the second housing.

In another aspect combinable with any of the previous aspects, the first controller is communicably coupled to the second controller through the cable.

In another aspect combinable with any of the previous aspects, the second controller includes a master controller, and the first controller includes a slave controller.

In another aspect combinable with any of the previous aspects, the first body has a first weight, and the second body has a second weight greater than the first weight.

In another aspect combinable with any of the previous aspects, the first housing is formed of a first material having a first density, and the second housing is formed from a second material having a second density greater than the first density.

In another aspect combinable with any of the previous aspects, at least one of the first or second inner volumes is configured to enclose a pressurized fluid.

In another aspect combinable with any of the previous aspects, at least one of the first or second magnetic anchors includes two permanent magnets connected in parallel between two ferromagnetic poles, with a first permanent magnet of the two permanent magnets having a higher coercivity or resistance than a second permanent magnet of the two permanent magnets.

Another aspect combinable with any of the previous aspects further includes a coating applied to at least a portion of an exterior surface of each of the two ferromagnetic poles, and the coating includes a high friction material relative to the exterior surface.

In another example implementation, a method includes inserting an untethered downhole tool into a wellbore that includes a wellbore tubular at or near a terranean surface. The untethered downhole tool includes a first body including a first housing that defines a first inner volume, and a first magnetic anchor coupled to the first body; a second body including a second housing that defines a second inner volume, and a second magnetic anchor coupled to the second body to the wellbore tubular; at least one logging sensor positioned in or on at least one of the first or second housings; a motor attached to one of the first or second bodies and coupled to a spooler that includes a cable coupled to the spooler and attached to the other of the first or second bodies; and at least one controller positioned in at least one of the first or second housings and communicably coupled to the motor and the first and second magnetic anchors. The method further includes adjusting, with the controller, one of the first or second magnetic anchors from an active state in which the one of the first or second magnetic anchors magnetically attaches the respective first or second body to the wellbore tubular to an inactive state to detach the respective first or second body from the wellbore tubular; and activating, with the controller, the motor to operate the spooler to spool the cable from the spooler to increase a length of a portion of the cable between the spooler and the detached first or second body.

An aspect combinable with the example implementation further includes determining, with the controller, that the length of the portion of the cable is at a predetermined length; and based on the determination, deactivating, with the controller, the motor and adjusting the one of the first or second magnetic anchors from the inactive state to the active state to re-attach the respective first or second body to the wellbore tubular such that the first and second bodies are both attached to the wellbore tubular a distance substantially equal to the predetermined length.

In another aspect combinable with any of the previous aspects, determining that the length of the portion of the cable is at the predetermined length includes determining, with the controller, a number of revolutions completed by the spooler to spool the cable from the spooler to increase the length of the portion of the cable between the spooler and the detached first or second body; calculating, with the controller, the length of the portion of the cable based on the determined number of revolutions; and comparing the calculated length to the predetermined length.

Another aspect combinable with any of the previous aspects further includes adjusting, with the controller, the other of the first or second magnetic anchors from the active state to the inactive state to detach the other of the first or second body from the wellbore tubular; activating, with the controller, the motor to operate the spooler to spool the cable on the spooler to decrease the length of the portion of the cable between the spooler and the detached first or second body; determining, with the controller, that the length of the portion of the cable is at a minimum length; and based on the determination, deactivating, with the controller, the motor and adjusting the other of the first or second magnetic anchors from the inactive state to the active state to re-attach the other of the first or second body to the wellbore tubular such that the first and second bodies are both attached to the wellbore tubular a distance substantially equal to the minimum length.

Another aspect combinable with any of the previous aspects further includes identifying, with the controller, logging measurements from the at least one sensor; and storing, with the controller, the identified logging measurements in at least one memory of the controller.

In another aspect combinable with any of the previous aspects, the at least one controller includes a first controller positioned in the first housing; and a second controller positioned in the second housing.

Another aspect combinable with any of the previous aspects further includes providing at least one of data or power from the first controller to the second controller through the cable.

In another aspect combinable with any of the previous aspects, the second controller includes a master controller, and the first controller includes a slave controller.

In another aspect combinable with any of the previous aspects, the first body has a first weight, and the second body has a second weight greater than the first weight.

Another aspect combinable with any of the previous aspects further includes forming the first housing of a first material having a first density, and forming the second housing from a second material having a second density greater than the first density.

Another aspect combinable with any of the previous aspects further includes filling at least one of the first or second inner volumes with a pressurized fluid.

In another aspect combinable with any of the previous aspects, at least one of the first or second magnetic anchors includes two permanent magnets connected in parallel between two ferromagnetic poles, with a first permanent magnet of the two permanent magnets having a higher coercivity or resistance than a second permanent magnet of the two permanent magnets.

In another aspect combinable with any of the previous aspects, adjusting the one of the first or second magnetic anchors from the inactive state to the active state includes controlling a power source of the respective first or second bodies to provide power to a coil of the second permanent magnet; generating an external flux in a first direction through the second permanent magnet; and extending at least a portion of one or more magnetic field lines from the two ferromagnetic poles to attach to the wellbore tubular.

Another aspect combinable with any of the previous aspects further includes adjusting the one of the first or second magnetic anchors from the active state to the inactive state by controlling the power source of the respective first or second bodies to provide power to the coil of the second permanent magnet; generating the external flux in a second direction through the second permanent magnet; and retaining a portion of the one or more magnetic field lines within the two ferromagnetic poles to detach from the wellbore tubular.

Implementations of systems and methods for logging a well with a downhole logging tool according to the present disclosure may include one or more of the following features. For example, a downhole logging tool according to the present disclosure can continuously measure depth as it moves through the wellbore. As another example, a downhole logging tool according to the present disclosure can actively control its speed through the wellbore. As another example, a downhole logging tool according to the present disclosure can control its own speed or rate of downhole or uphole movement in a wellbore independent of any downhole conveyance. Further, a downhole logging tool according to the present disclosure can orient itself with respect to a casing compared to passively moving untethered downhole tools, such as tools that move merely based on fluid flow or buoyancy. In addition, a downhole logging tool according to the present disclosure can operate against the casing wall, and allow more accurate measurements of parameters that require being close or attached to the casing, such as casing collar detection, casing thickness, corrosion rate measurements. As a further example, a downhole logging tool according to the present disclosure can independently adjust a length of the tool (by adjusting a spooled amount of cable between two bodies of the tool), which can be advantageous for measurements that require transducers spaced apart a particular distance (such as formation resistivity measurement, casing wall thickness, measurement of many layers of concentric casings, seismic measurements, very low frequency EM measurements).

Further, a downhole logging tool according to the present disclosure can, as an untethered tool, pass through constrictions without getting stuck compared to passively moving untethered tools, such as tools that move merely based on fluid flow or buoyancy. For example, going out of the production tubing, a passively moving untethered tool may not guide itself back into the production tubing while rising, and may end up stuck in the annulus between the production tubing and the casing. The design of the downhole tool of the present disclosure can keep one body anchored while another body connected to the first body forward for "exploration." The second body can be pulled back next to the anchored body when needed for safety. As another example, a downhole tool according to the present disclosure can move and log at significantly higher speeds than other, tethered or untethered tools that are at least periodically attached to a casing, which utilize an expanding solid body rather than the unspooled cable of the present downhole tool. As another example, a downhole tool according to the present disclosure can require less energy to operate as compared to other tethered or untethered tools that are at least periodically attached to a casing with a solid, expandable body. As another example, a downhole tool according to the present disclosure can act as a very long tool. Some wireline tools reach lengths of tens of feet due to the need for placement of various sources and receivers (such as acoustic or EM sources and receivers), which requires special tools to deploy them and makes it a challenging operation. The downhole tool according to the present disclosure can achieve this with a very small footprint during the deployment and retrieval of the tool while the tool can expand to a desired long length (several 10 s of feet) by unspooling its wire between the bodies within a well. Another feature of the downhole tool according to the present disclosure is that the length between the source and the detector can be adjusted by spooling and unspooling. This length is usually fixed in a rigid wireline tool body. Being able to adjust the length between a source and a receiver is useful such that, in general, as the spacing between the source and the receiver is increased a larger distance from the tool body can be interrogated.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3E are schematic illustrations of an example method of operating a downhole tool for logging a well in a wellbore according to the present disclosure.

DETAILED DESCRIPTION

Figure 1:
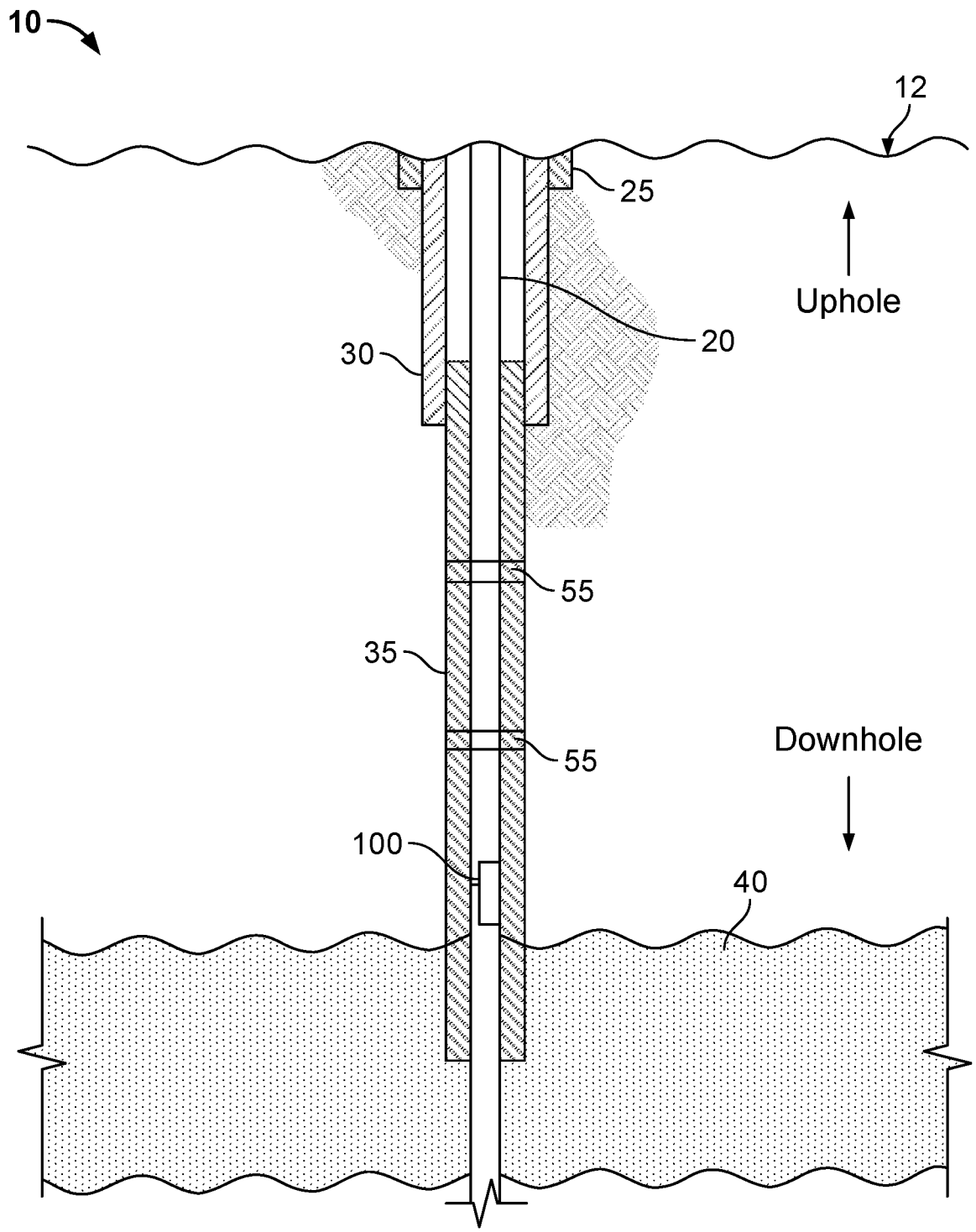
FIG. 1 is a schematic diagram of an example implementation of a wellbore system that includes a downhole tool for a logging well according to the present disclosure.

FIG. 1 is a schematic diagram of wellbore system 10 that includes a downhole tool 100 according to the present disclosure. Generally, FIG. 1 illustrates a portion of one embodiment of a wellbore system 10 according to the present disclosure in which the downhole tool 100 can move through a wellbore 20 under its own motive power without being attached to a downhole conveyance such as a wireline, slickline, tubular work string, coiled tubing, or other solid conveyance. In some aspects, the downhole tool 100 can perform logging operations during movement (or otherwise) in the wellbore 20 to measure or sense one or more wellbore or reservoir parameters, such as pressure, temperature, depth, resistivity, gamma, or other parameters.

In the example implementation, the downhole tool 100 can be untethered in that, during the running in process, the running out process, or during any operations of the downhole tool 100 in the wellbore 20, the downhole tool 100 is disconnected, decoupled, or otherwise unattached from any downhole conveyance that extends from a terranean surface into a wellbore (such as wireline, slickline, coiled tubing, or other tubular workstring). In some aspects, the untethered downhole tool 100 may be initially conveyed into the wellbore 20, or out of the wellbore 20 by, for instance, a fluid circulated within the wellbore 20, either alone or in combination with other forces on the untethered downhole tool 100 (for example, gravitational forces, buoyant forces, hydrodynamic forces, or a combination thereof). However, in example operations as described herein, the downhole tool 100 can move through the wellbore 20 in an uphole and/or downhole direction at least partially under its own motive force and in contact with a casing (such as in contact with a production casing 35 as shown) or other tubular positioned in the wellbore 20. In some aspects, the untethered downhole tool 100 comprises a relatively lightweight miniaturized tool (for example, a tool with a size several times smaller than the wellbore diameter).

According to the present disclosure, the downhole tool 100 can move through the wellbore 20 in a logging operation, as well as to operate as a casing collar locator in the wellbore 20. For example, as shown, the wellbore can be or include a production casing 35 that extends into a subterranean formation 40 and includes casing collars 55 that connect joints of the production casing 35 together (for example, threading), in order to construct the casing 35.

As shown, the wellbore system 10 accesses the subterranean formation 40 and provides access to hydrocarbons located in such subterranean formation 40. In an example implementation of system 10, the system 10 may be used for a production operation in which the hydrocarbons may be produced from the subterranean formation 40 within a wellbore tubular (for example, through the production casing 35 or other production tubular).

A drilling assembly (not shown) may be used to form the wellbore 20 extending from the terranean surface 12 and through one or more geological formations in the Earth. One or more subterranean formations, such as subterranean formation 40, are located under the terranean surface 12. As will be explained in more detail below, one or more wellbore casings, such as a surface casing 30 and production casing 35, may be installed in at least a portion of the wellbore 20. In some embodiments, a drilling assembly used to form the wellbore 20 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more wellbore systems 10 from either or both locations.

In example embodiments of the wellbore system 10, the wellbore 20 is cased with one or more casings, such as steel casings or other casings made of magnetic materials. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 may be the surface casing 30. The surface casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the production casing 35. Any of the illustrated casings, as well as other casings or tubulars that may be present in the wellbore system 10, may include one or more casing collars 55. In the example implementation of wellbore system 10, the production casing 35 and casing collars 55 (as well as other tubular casings) can be made of steel.

Figure 2:
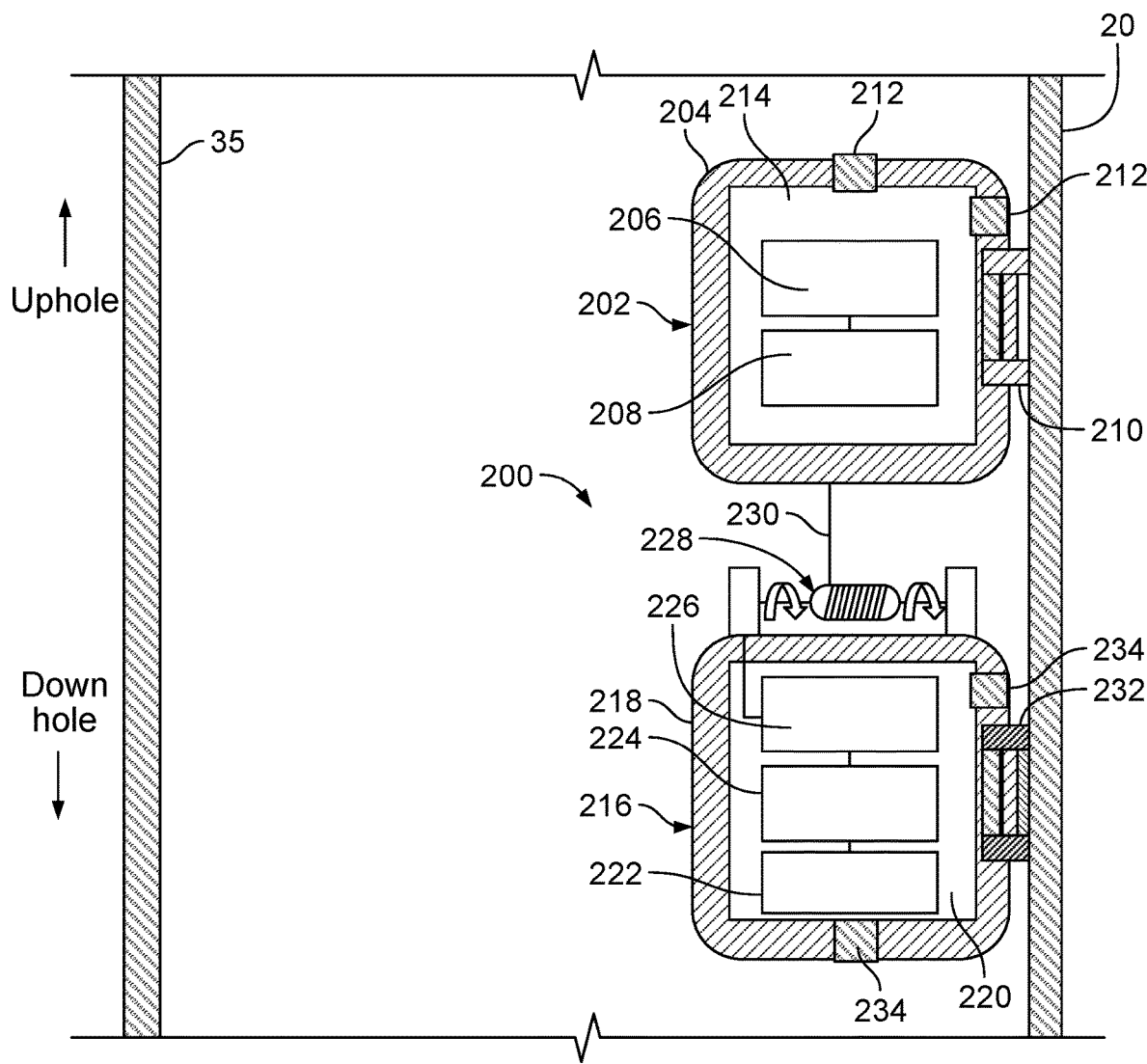
FIG. 2 is a schematic diagram of an example implementation of a downhole tool for logging a well in a wellbore according to the present disclosure.

FIG. 2 is a schematic diagram of an example implementation of a downhole tool 200 for logging a well in a wellbore according to the present disclosure. In some aspects, downhole tool 200 is an untethered downhole tool 200 and can be used in the wellbore system 100 as downhole tool 100 within the wellbore 20 (and casing 35) as shown in that figure. FIG. 2 shows the downhole tool 200 in the wellbore 20 and in contact (for example, magnetic contact) with the production casing 35. In this example implementation, downhole tool 200 includes a first body 202 and a second body 216 coupled together with a cable 230 (each body 202 and 216 being an untethered tool body 202 and 216). In some aspects, the first body 202 is an uphole body 202 and the second body 216 is a downhole body 216 in that, during movement of the downhole tool 200 through a wellbore, the uphole body 202 is always or almost always positioned uphole of the downhole body 216. However, such a convention is only an example and does not exclude implementations in which each of the bodies 202 and 216 of the downhole tool 200 are, at some time during movement in a wellbore, can be in an "uphole" position relative to the other of the bodies 202 and 216. Further, although two "bodies" are shown in this example implementation, the downhole tool 200 can include more than two bodies, each pair coupled together by, for instance, a separate and spoolable cable.

In some aspects, each body 202 and 216 comprises or forms a fluid-tight housing in which one or more components of the downhole tool 200 are positioned. For example, the first body 202 includes a housing 204 that defines a volume 214 into which one or more components of the downhole tool 200 are positioned. The housing 204 can be pressure compensated (for example, potted, oil filled volume 214) or an atmospheric chamber. The housing 204 can be made of metal, plastic, or a type of foam to achieve a desired effective buoyancy and mechanical strength.

In this example, the first body 202 includes a power source 206 coupled (for example, electrically or communicably, or both) to a controller 208. In this example, the controller 208 can include, for instance, one or more microprocessors, memory, a transducer and motor driver and control circuits, sensor readout circuits, along with sensors such as inertial measurement units (for example, accelerometer, gyroscope, magnetometer), a temperature sensor, a pressure sensor, or a combination thereof. In short, the controller 208 can operate, alone or in combination with a controller 224 of the second body 216, to control movement of the downhole tool 200 in the wellbore (as explained more fully below), as well as sense or measure particular parameters in the wellbore.

As shown in FIG. 2, a magnetic anchor 210 is positioned in or on the housing 204 and controllable (for example, to apply a magnetic force or not) by the controller 208 in order to attach (semi-permanently) the housing 204 to the casing 35 (or other magnetic tubular in a wellbore). For example, the controller 208 can also include a magnet control circuit that controls the magnetic anchor 210 between "active" and "inactive" states. The magnetic anchor 210, in this example, can include at least two permanent magnets of which one can be changed in polarity to enhance or cancel the magnetic field of the other magnet. Although the magnetic anchor 210 is not permanently powered, the condition in which the polarity of one magnet is switched to enhance the magnetic field of the other magnet, allowing flux lines to extend outside of the housing, is termed the "active" state. Similarly, the condition in which the polarity of the one magnet is switched to cancel the magnetic field of the other magnet, blocking flux lines from extending outside of the housing, is termed the "inactive" state. More detailed example implementations of a magnetic anchor are also described further with respect to FIGS. 4A and 4B.

As shown in FIG. 2, the first body 202 includes one or more sensors 212 (with two shown, but any number contemplated by the present disclosure) positioned in or on the housing 204. In some aspects, the sensors 212 can measure or sense logging parameters, such as pressure and/or temperature (for example, of a fluid in the wellbore), resistivity, gamma, or other parameter. Other examples include fluid phase, fluid density and viscosity, chemical composition, hydrogen concentration, pH, salinity, conductivity, flow rate, casing diameter and thickness, corrosion rate, cement bonding strength, and other formation properties such as permittivity, permeability, and mechanics. further aspects, one of the bodies 202 or 216 can include an electromagnetic or acoustic source and the other of the bodies 202 or 216 can include an electromagnetic or acoustic receiver.

In some aspects, the measurements can be communicated by the sensors 212 to the controller 208. Electrical power to the controller 208, the sensors 212, the magnetic anchor 210 (or a combination thereof) can be provided by the power source 206, which is or includes, for instance, one or more batteries.

Similarly, the second body 216 includes a housing 218 that defines a volume 220 into which one or more components of the downhole tool 200 are positioned. The housing 218 can be pressure compensated (for example, potted, oil filled volume 214) or an atmospheric chamber. The housing 218 can be made of metal, plastic, or a type of foam to achieve a desired effective buoyancy and mechanical strength.

In this example, the second body 216 includes a power source 222 coupled (for example, electrically or communicably, or both) to a controller 224 and to a motor 226. In this example, the controller 224 can include, for instance, one or more microprocessors, memory, a transducer and motor driver and control circuits, sensor readout circuits, along with sensors such as inertial measurement units (for example, accelerometer, gyroscope, magnetometer), a temperature sensor, a pressure sensor, or a combination thereof. In short, the controller 224 can operate, alone or in combination with the controller 208, to control movement of the downhole tool 200 in the wellbore (as explained more fully below), as well as sense or measure particular parameters in the wellbore.

As shown in FIG. 2, a magnetic anchor 232 is positioned in or on the housing 218 and controllable (for example, to apply a magnetic force or not) by the controller 224 in order to attach (semi-permanently) the housing 218 to the casing 35 (or other magnetic tubular in a wellbore). For example, the controller 224 can also include a magnet control circuit that controls the magnetic anchor 232 between "active" and "inactive" states. The magnetic anchor 232, in this example, can include at least two permanent magnets of which one can be changed in polarity to enhance or cancel the magnetic field of the other magnet. Although the magnetic anchor 232 is not permanently powered, the condition in which the polarity of one magnet is switched to enhance the magnetic field of the other magnet, allowing flux lines to extend outside of the housing, is termed the "active" state. Similarly, the condition in which the polarity of the one magnet is switched to cancel the magnetic field of the other magnet, blocking flux lines from extending outside of the housing, is termed the "inactive" state. More detailed example implementations of a magnetic anchor are also described further with respect to FIGS. 4A and 4B.

As shown in FIG. 2, the second body 216 includes one or more sensors 234 (with two shown, but any number contemplated by the present disclosure) positioned in or on the housing 218. In some aspects, the sensors 234 can measure or sense logging parameters, such as pressure and/or temperature (for example, of a fluid in the wellbore), resistivity, gamma, or other parameter. Other examples include fluid phase, fluid density and viscosity, chemical composition, hydrogen concentration, pH, salinity, conductivity, flow rate, casing diameter and thickness, corrosion rate, cement bonding strength, and other formation properties such as permittivity, permeability, and mechanics. In some aspects, the measurements can be communicated by the sensors 234 to the controller 224. Electrical power to the controller 224, the sensors 234, the magnetic anchor 232, and the motor 226 (or a combination thereof) can be provided by the power source 222, which is or includes, for instance, one or more batteries.

The motor 226 is positioned in the volume 220 of the second body 216 and is controllable (for example, by the controller 224) to operate a spooler 228 positioned on the housing 218 to release (spool off) or gather (spool on) the cable 230. By releasing or gathering the cable 230 off or on the spooler 228, a distance between the first body 202 and the second body 216 can be increased or decreased, respectively.

In some aspects, the motor is connected to the spooler 228 through a shaft. In some aspects, there can be a gearbox attached between the motor 226 and the spooler 228 to increase the torque. The motor 226 and spooler 228 can be external or internal to the housing 218. In some aspects, the placement of an attachment point of the cable 230 to the spooler 228 can be optimized to reduce interaction of the pulled or released body, respectively.

In example implementations, a total length of the cable 230 can be a few feet to tens of feet (for example, 100 feet). In some aspects, the motor 226 (or controller 224) includes an encoder that can count a number of turns of the spooler 228 (for example, 360 degree rotations) and/or a rotational speed of the spooler 228. These measured values can provide feedback (by the encoder) to the controller 224 to control the motor 226 and to calculate the length of spooled cable 230 between the two bodies 202 and 216.

In some aspects, the cable 230 can carry or transport electrical signals and/or power between the two bodies 202 and 216. For example, a slip ring can be attached on the spooler 228 to enable electrical connections between ends of the cable 230 and, for example, the controllers 208 and 224. As an example, the cable 230 can contain two conductors that are insulated from each other. Therefore, an electric potential can be applied between the two conductors, which can be used to transmit power or information (a data signal) between the two controllers 208 and 224. This can be advantageous where, for example, only one of the two bodies 202 or 216 includes a power source, and power needs to be transmitted to the other of the two bodies 202 or 216 (for example, to activate a magnetic anchor). As another example, this can be advantageous where, for example, only one of the two bodies 202 or 216 includes a controller, and data or control signals needs to be transmitted to the other of the two bodies 202 or 216. If each body 202 and 216 has a power source and a controller, the cable 230 may not need to carry or transport electrical signals and/or power.

In some aspects, the controller 224 and the controller 208 are in a master-slave relationship, with the controller 224 (in this example) comprising the master controller. For example, in order to synchronize movement of the bodies 202 and 216 (as described more fully with reference to FIGS. 3A-3E), a communication channel can be established between the controllers 208 and 224, and the operation of the two bodies 202 and 216 can be orchestrated by the master controller (whether that is the controller 224 or the controller 208). In some aspects, the master controller is the controller 224 as being in direct communication with the motor 226 for active control of the motor 226. The master (controller 224) can send commands to the slave (controller 208) to turn switch the magnetic anchor 210 between active and inactive states, and the slave controller can provide status updates to the master about its state. In some aspects, the master controller can use data from sensors (for example, sensors 234 and/or sensors 212) such as pressure, temperature, magnetic field, proximity, wire length, casing collar location, and status reports from the slave controller to change the state of the magnetic anchors 210 and/or 232, as well as, for instance, change the state of the motor 226 (to spool or unspool the cable 230 from the spooler 228). Such a communication channel can be electrical through the cable 230, or acoustic through the cable 230, fluid media, or the casing wall. Alternatively, near field magnetic and optical communication channels are also contemplated by the present disclosure.

In a second method for synchronization, each controller 208 and 224 can act independently from each other. In this second example, the synchronization can be established based on synchronized timers within the respective controllers 208 and 224. For example, when the two bodies 202 and 216 detect each other within a particular distance range, each controller 208 and 224 can start a timer (for example, at relatively similar time instants). Then each respective controller 208 and 224 can turn switch the respective magnetic anchors between active and inactive states, as well as spool/unspool the cable 230 at previously determined preset time periods. The tolerance on the timing can be determined or programmed into the controllers 208 and 224 based on, for example, a synchronization precision. For example, if the timers can synchronize within 1 second (s) precision, more than 1 s extra time can be allowed for each state change to finish. Various sensors can be used to detect proximity of the housings 204 and 218. For example, a magnetometer can sense a strong magnetic field from a magnet on the other part such as a casing collar locator magnet, spool motor, anchor magnet or another magnet that is used only for proximity sensing.

As described, the first body 202 can be the uphole body 202 while the second body 216 can be the downhole body 216. In some aspects, the downhole body 216 can, as a whole, be denser than the uphole body 202. For example, depending on a type of fluid (or fluids) in the wellbore 20, a particular material (with particular density) can be selected for each of the respective housings 204 and 218. A denser material can be selected for the housing 218, thereby making the downhole body 216 denser than the uphole body 202. The densities of potential materials can be between, for example, 0.4-0.9 g/cc (for the housing 204), and 1-2 g/cc (for the housing 218), respectively.

Further, various strategies can be employed to distribute particular components between the two housings 204 and 218 for desired effective buoyancies. For example, denser parts such as the motor 226, spooler 228, and/or an optional casing collar locator, can be placed on or in the housing 218 of the downhole body 216. As another example, the housing 204 can have or be an atmospheric chamber (with the volume 214 unfilled with a liquid or other substance) to increase its buoyancy. As an option, various mechanisms can be used to change the buoyancy of the housings 204 and 218. For example, a weight or a suite of weights can be released to make the downhole tool 200 more buoyant. A pump can be used to fill and empty a bladder to tune the buoyancy. Such additions can be helpful in some scenarios. For example, in one scenario, aborting a wellbore operation of the downhole tool 200 and returning to a terranean surface as soon as possible may be necessary. Increasing a net buoyancy of the downhole tool 200 and releasing, for example, the magnetic anchors, the downhole tool 200 can rise or float to the terranean surface (through a wellbore fluid) relatively faster than the movement of the downhole tool 200 as described with reference to FIGS. 3A-3E. In some aspects, geometries of the respective housings 204 and 218 can be optimized for various goals. For example, the housings 204 and/or 218 can have conical tips on uphole and downhole ends to make them easily pass through constrictions as commonly used in many downhole tools. In some aspects, a streamline shape for the housings 204 and/or 218 can be preferred to reduce energy lost against a drag force applied on the downhole tool 200.

FIGS. 3A-3E are schematic illustrations of an example method of operating the downhole tool 200. In the example method, the downhole tool 200 can first be inserted into the wellbore 20. For example, the downhole tool 200 can be deployed into the wellbore 20 through a Christmas tree. In this example, the master and swab valves are closed, and the well cap is opened to insert the tool 200 inside the wellbore 20. Right after the tool 200 is inserted, it anchors itself on the wall of the Christmas tree (for example, by activating one or both of the magnetic anchors 210 and 232). After the cap is closed, the valves are opened, and the downhole tool 200 starts its travel to a desired location in the wellbore 20.

FIG. 3A shows a schematic illustration of the downhole tool 200 after it has been inserted into the wellbore 20 and both magnetic anchors 210 and 234 are active to magnetically engage the respective housings 204 and 218 against the (steel or other magnetic material) production casing 35. For example, once in the wellbore 20, the respective controllers 208 and 224 (or a single one of the controllers 208 or 224) may activate the magnetic anchors 210 and 234. As shown in FIG. 3A, the cable 230 is largely (if not fully) spooled onto the spooler 228, thereby keeping the first and second bodies 202 and 216, for example, a minimum distance apart. In FIG. 3A, the sensors 212 and 234 (as well as other sensors in the downhole tool 200) can take measurements or otherwise log the wellbore 20. Once finished a logging procedure at the location shown in FIG. 3A, the downhole tool 200 can begin an operation to move to another location in the wellbore 20.

The moving operation can begin with reference to FIG. 3B, which shows the second (or downhole) body 216 detached from the casing 35 and the cable 230 spooled a particular distance in order to separate the body 216 further downhole from the first (or uphole) body 202. For example, the controller 224 can adjust the magnetic anchor 232 into an inactive state, thereby releasing the second body 216 from the casing 35 (as no magnetic force acts with the magnetic anchor 232 in the inactive state). Subsequently or simultaneously, the controller 224 can activate the motor 226 to spool cable 230 from the spooler 228, such as a particular or determined distance. The second body 216 will then move downhole, detached from the casing 35 until the controller 224 then deactivates the motor 226 (thereby stopping the spooling of the cable 230 from the spooler 228).

Next, with reference to FIG. 3C, the controller 224 can adjust the magnetic anchor 232 into an active state, thereby turning on the magnetic anchor 232 and attracting the second body 216 to the casing 35. In the active state, the magnetic anchor 232 will hold the second body 216 against the casing 35 by a magnetic attraction force. As shown in FIG. 3C, both bodies 202 and 216 are magnetically anchored to the casing 35, with the cable 230 spooled the predetermined or desired distance.

Turning to FIG. 3D, the moving operation continues, and the controller 208 (or controller 224) adjusts the magnetic anchor 210 into the inactive state. In the inactive state, the magnetic anchor 210 releases the first body 202 from the casing 35, thereby allowing the first body 202 to move into the wellbore 20 from the casing 35. In some aspects, the first body 202 may be weighted (for example, based on the fluid in the wellbore 20 or otherwise) to remain stationary (in other words, float) in the wellbore 20 when magnetically released from the casing 35. Alternatively, the first body 202 may be buoyant in the wellbore 20 and urged (by a buoyancy force) uphole; in such cases, the cable 230 can retain the first body 202 tethered to the second body 216 (which is magnetically anchored to the casing 35). In some cases, the first body 202 may be weighted to move (for example, gradually) downhole toward the second body 216.

In some aspects, as shown in FIG. 3D, the motor 226 is activated (for example, by the controller 224) to spool the cable 230 onto the spooler 228 in order to pull the first body 202 toward the second body 216. In some aspects, as described, an encoder can determine a length of the cable 230 between the two bodies 202 and 216. For example, the encoder can provide feedback, for instance, to the controller 224, regarding a number of turns of the spooler 228 or a rotational speed over time of the spooler 228 (or both). The controller 224 can then determine (relative to a length of spooled cable 230 as shown in FIG. 3C) the distance of the cable 230 for the moving step shown in FIG. 3E.

As shown in FIG. 3E, once the first body 202 has been moved (by the spooling cable 230) to a particular or minimum distance from the second body 216, the motor 226 can be deactivated (for example, by the controller 224) to stop the spooling. Simultaneously or subsequently, the magnetic anchor 210 can be adjusted to the active state (for example, by the controller 208 or the controller 224). In the active state, the magnetic anchor 210 can then attach the first body 202 to the casing 35 as shown in FIG. 3E.

Once the operational step has been completed as shown in FIG. 3E, the downhole tool 300 can be in the same state (for example, magnetic anchors 210 and 232 in an active state, with the cable 230 spooled onto the spooler 228) as shown in FIG. 3A. However, in FIG. 3E, the downhole tool 200 is further downhole in the wellbore 20 relative to its position in FIG. 3A. By repeating the sequence of steps as described with reference to FIGS. 3A-3E, the downhole tool 300 can move downhole in the wellbore, logging (if desired) during or at each step.

Assuming little or no slippage of the bodies 202 and 216 when magnetically attached to the casing 35, a depth of the downhole tool 200 can be measured by measuring the cable 230 released in total during a moving operation within the wellbore 20. For example, at the instance of FIG. 3A, an encoder can be reset and start a new measurement of spooled out cable 230. At the instance of FIG. 3C, the number of turns of the spooler 228 reported by the encoder can be converted to length of cable 230 based on the diameter of the spooler 228. A change in spooler diameter due to added or released cable 130 can be factored into the calculation for more precise measurements. Then, the same cable length is spooled back at the instance of FIG. 3E. At this point, the depth can be registered as the previous depth plus the measured released cable length, and this calculation process can be completed.

Although FIGS. 3A-3E describe a downhole movement of the downhole tool 200, the downhole tool 200 can also operate to move uphole, in a similar fashion. For example, the process described in FIGS. 3A-3E can be reversed, such that the first body 202 is released from the casing 35 while the second body 216 is anchored to the casing 35, and moves (for example, floats in a wellbore fluid) uphole while the cable 230 spools off of the spooler 228. When a maximum or desired spooled length of the cable 230 is reached, the first body 202 can be re-anchored to the casing 35, and the second body 216 can be released from the casing 35. The cable 230 is then re-spooled onto the spooler 228 by the motor 226 until the second body 216 moves uphole to meet the first body 202 (and is re-anchored). This process can be repeated to cause uphole movement of the downhole tool 200 in the wellbore 20.

When the downhole tool 200 returns to a terranean surface, it can be removed from the wellbore 20. Logging data taken during movement downhole and/or uphole (one or many times) in the wellbore 20 can be stored (for example, in memory of the controller 224 and/or controller 208) can then be retrieved.

Figure 4A:
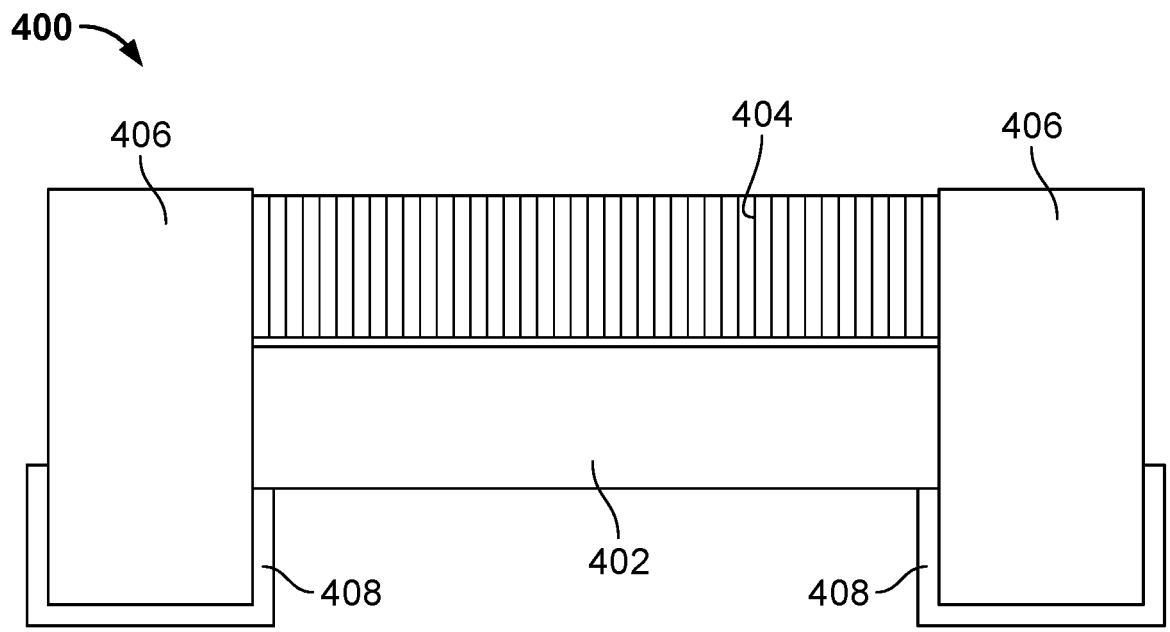
FIGS. 4A and 4B are schematic illustrations of example implementations of a magnetic casing anchor of a downhole tool according to the present disclosure.
Figure 4B:
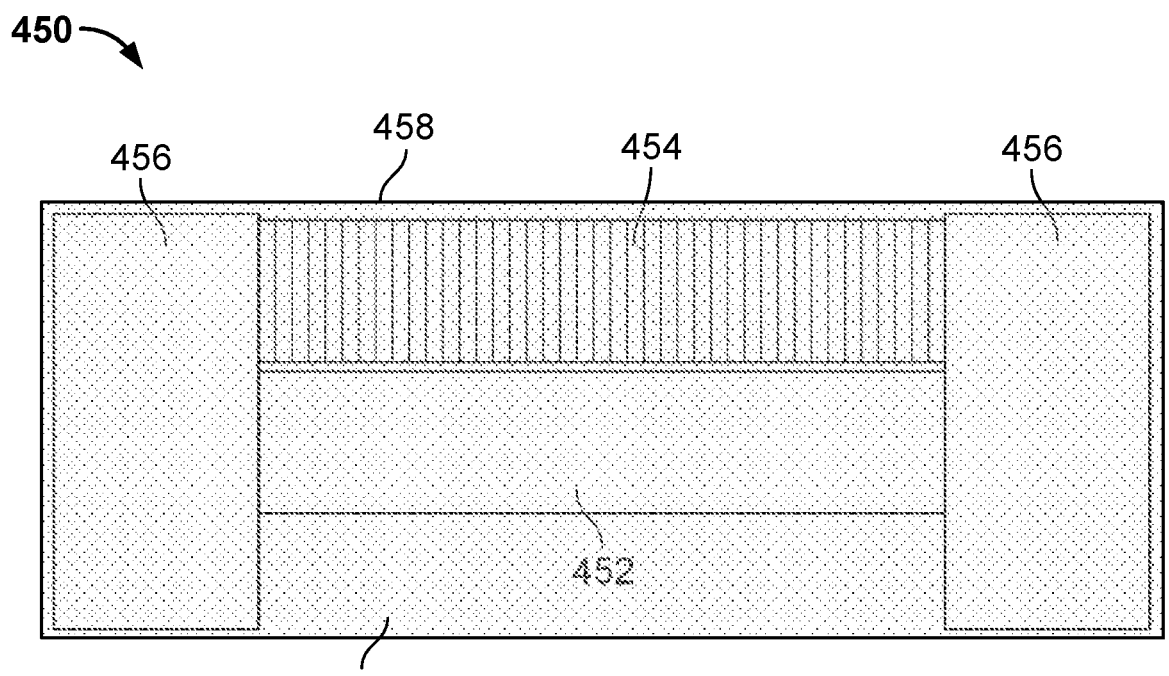

FIGS. 4A and 4B are schematic illustrations of magnetic casing anchors 400 and 450 of a downhole tool according to the present disclosure. Each of magnetic casing anchors 400 and 450 can be used as either or both of magnetic anchors 210 or 232 shown in FIG. 2. Turning to FIG. 4A, magnetic casing anchor (or magnetic anchor) 400 is shown. Magnetic anchor 400 includes a coil 404 adjacent a magnet 402, with both positioned between ferromagnetic poles 406. In some aspects, the coil 404 includes an Al—Ni—Co magnet core, while the magnet 402 is a neodymium permanent magnet. As shown in FIG. 4A, a coating 408 is applied to at least a portion of an external surface of the poles 406. This coating 408, which can be a rubber coating or other high friction material, can be applied to the surface of the poles 406 that contact, for example, a steel casing or other magnetic tubular in a wellbore. In some aspects, the coating 408 can reduce slippage of the magnetic anchor 400 when active and attached to the casing or tubular.

Turning to FIG. 4B, magnetic casing anchor (or magnetic anchor) 450 is shown. Magnetic anchor 450 includes a coil 454 adjacent a magnet 452, with both positioned between ferromagnetic poles 456. In some aspects, the coil 454 includes an Al—Ni—Co magnet core, while the magnet 452 is a neodymium permanent magnet. As shown in FIG. 4B, a potting 458 can be applied to the magnetic anchor 450, thereby creating a flush exterior surface of the anchor 450. This potting 458, which can be a rubber material or other high friction material, can be applied to all surfaces of the anchor 450, including those that contact, for example, a steel casing or other magnetic tubular in a wellbore. In some aspects, the potting 458 can reduce slippage of the magnetic anchor 450 when active and attached to the casing or tubular.

Generally, the coils and magnets of the example magnetic anchors 400 and 450 are connected in parallel and act as two permanent magnets. One of the permanent magnets (for example, the magnets 402 or 452) is made of a material that has a higher coercivity or resistance to having its magnetization direction reversed, for example, samarium cobalt (SmCo) or Neodymium-Iron-Boron (NiFeB, or NIB), among others. The second permanent magnet (for example, the core magnets in the coils 404 and 454) is made of a material that has a lower coercivity or resistance to having its magnetization direction reversed, and therefore can have its polarization direction changed easily, for example, aluminum nickel cobalt (Al—Ni—Co, Alnico V), among others. The size and material of the two permanent magnets is selected so that they have essentially the same magnetic strength, i.e., remnant magnetization.

As shown, a coil 404 or 454 of wire is wrapped around the lower coercivity magnet. In another embodiment, a coil may be wrapped around both magnets, since the higher coercivity magnet is chosen such that it will not be repolarized by the field produced by the coil 404 or 454. In another embodiment, there are an even number of magnets, e.g., two, four, or more, all of the same low coercivity material (such as Al—Ni—Co) and the same dimensions. The coil 404 or 454 of wire is wrapped around half of the magnets, such that only half of the magnets have polarization switched by the coil. Making all magnets of the same low coercivity material can simplify the matching of the magnetic strength of the repolarized and unrepolarized magnets. This helps to ensure field cancellation in the polarization or off state, as a failure to completely cancel the fields in the polarization state may result in a failure to decouple from a surface, such as the casing.

In some aspects, the respective power sources 206 and 222 can provide the voltage and current needed to power the repolarization; if not, a boost circuit can be included in each of the first and second bodies 202 and 216 to provide the power to switch the respective magnetic anchor between an external flux, or active, state and an internal flux, or inactive, state. Power can be provided to the coil of the respective magnetic anchor 400 or 450. When a short pulse, or sequence of pulses, of a large electrical current is applied to the coil of wire in a first direction, it permanently polarizes the lower coercivity magnet, e.g., the magnets 402 and 452. In some aspects, the pulse or each of the pulses is about 200 microseconds in duration, at a current of about 20 amps. In example aspects, this orients the flux lines in the same direction as the higher coercivity magnet, e.g., the coil magnet 404 and 454. This is described herein as the external flux or active state in which the magnetic flux lines run through poles 406 or 456, attached to the magnets 402 and 452, to the outside of the downhole tool. In some aspects, the poles 406 and 456 are made of a material having a high magnetic permeability, such as iron. In the active state, the downhole tool can couple to a ferromagnetic surface, such as a casing or other wellbore tubular.

A pulse or pulse sequence applied to the coils 404 or 454 in a second direction reverses the polarization of the low coercivity magnet, e.g., the magnets 402 and 452, in the opposite direction from the high coercivity magnet, e.g., the coil magnet 404 and 454. This is described herein as the internal flux or inactive state, as the magnetic flux travels in a loop through the magnets 402 and 452 and through the poles 406 and 456, but does not substantially extend outside the downhole tool. This allows the downhole tool to decouple from a ferromagnetic surface, such as a casing or other wellbore tubular.

The downhole tool 200 can also perform operation example operations. For example, in some aspects, the downhole tool 200 can act as a casing collar locator (CCL). In some aspects, acting as a CCL, the downhole tool 200 can make secondary depth references to correct for errors in the depth measurement taken by the downhole tool 200, as the magnets and coils in the downhole tool 200 can operate to act as a CCL that senses casing collars when the downhole tool 200 moves past the casing collar. More specifically, two permanent magnets with a small separation and the same polarities opposing each other with a magnetic field measurement device (coil, hall sensor, magnetometer) in between the magnets (as described with reference to FIGS. 4A and 4B, can comprise a CCL. As a CCL, the downhole tool 200 can determine how many collars have been passed since the surface, the depth based on the previously known lengths of casing segments specified in a completion report or pervious wireline log that shows the collar depths can be checked.

Figure 5:
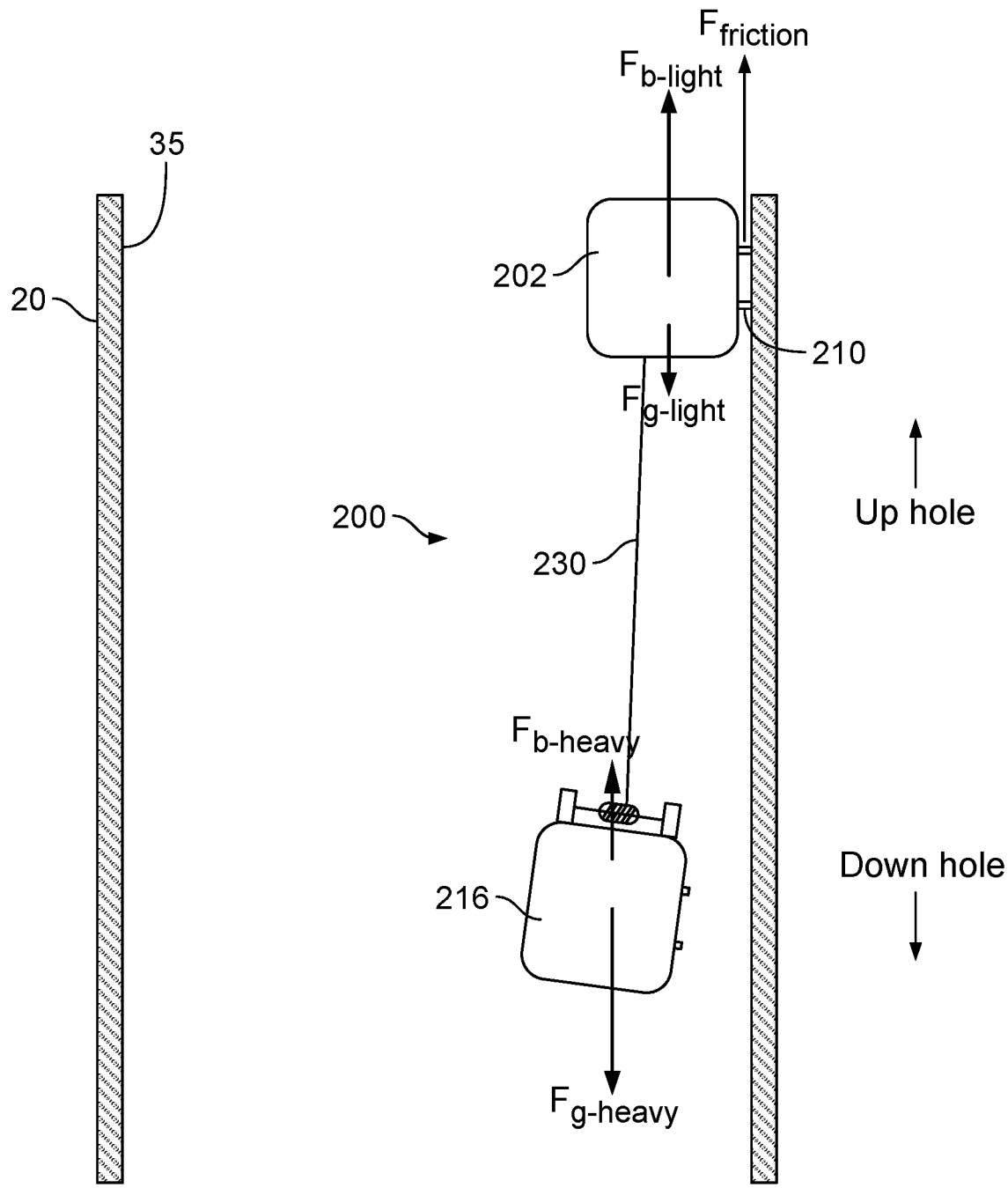
FIG. 5 is a schematic force diagram for an example implementation of a downhole tool for logging a well in a wellbore according to the present disclosure.

FIG. 5 is a schematic force diagram for an example implementation of a downhole tool for logging a well in a wellbore according to the present disclosure. FIG. 5, more specifically, shows the static forces acting on the bodies 202 and 204 of the downhole tool 200 in the wellbore 20 when there is no motion. In this diagram, the first body 202 is relatively less dense than the second body 216. Thus, forces applied to the first body 202 are labeled "light," while forces applied to the second body 216 are labeled "heavy." In this example diagram, the second body 216 is detached from the casing 35 while the first body 202 is magnetically anchored to the casing 35.

As shown, the forces acting on the first body 202 include: a buoyancy force, $F_{b\text{-}light}$, in an uphole direction; a gravity force, $F_{g\text{-}light}$ in a downhole direction; and a friction force, $F_{friction}$ that can be either in an uphole or downhole direction depending on the sum of other acting forces. The forces acting on the second body 216 include: a buoyancy force, $F_{b\text{-}heavy}$, in an uphole direction; and a gravity force, $F_{g\text{-}heavy}$ in a downhole direction. Of course, if the second body 216 was magnetically anchored to the casing 35, a friction force, $F_{friction}$ would also act on it.

The forces on each body 202 and 216 can be balanced or reduced to prevent slippage of an anchored body. For example, if the sum of weights and buoyant forces on the downhole tool 200 (as a whole) is near zero, there will be minimal force applied on each body 202 or 216 when it is magnetically anchored to the casing 35. The forces can be engineered as follows to reduce slippage (which can also be reduced by using or coating or potting on the magnetic anchors to increase the $F_{friction}$ as described) according to the following equations:

$$|F_{b\text{-}light}| > |F_{g\text{-}light}| \tag{1}$$

$$|F_{b\text{-}heavy}| < |F_{g\text{-}heavy}| \tag{2}$$

$$|F_{b\text{-}light} + F_{b\text{-}heavy}| \approx |F_{g\text{-}light} + F_{g\text{-}heavy}| \tag{3}$$

$$|F_{friction}| >> |F_{b\text{-}light} + F_{b\text{-}heavy} - F_{g\text{-}light} - F_{g\text{-}heavy}| \tag{4}$$

Although not required, having equations (1)-(4) satisfied can be advantageous to the downhole tool 200 functioning optimally. Further, slippage will mainly relate to equation (4) such that static friction is larger than all the other forces combined. For the dynamic conditions (i.e. when one of the bodies and/or the fluid is in motion), inertial and hydrodynamic forces can also be considered for a complete force analysis, such that:

$$|F_{friction}| > |F_{b\text{-}light} + F_{b\text{-}heavy} - F_{g\text{-}light} - F_{g\text{-}heavy} + F_{inertial} + F_{hydrodynamic}| \tag{5}$$

Inertial forces are in the direction of acceleration of the downhole tool 200. For example, in the case of the body 216 (for example, as the heavier or denser body) being released at a constant speed (by unspooling), if the releasing is suddenly stopped, a force will be applied on the heavier body in an uphole direction, and an equal amount of force will be applied on the body 202 (for example, as the lighter or less dense body) in a downhole direction. Depending on the direction of acceleration, this can change.

Further, if there is no fluid flow, a hydrodynamic force can act like the friction force, and it will act on a moving body in an opposite direction to the motion (for example, as a drag force). If there is fluid flow, there can be a hydrodynamic force on both bodies 202 and 216, which direction and amplitude can depend on the flow speed and the geometry of the bodies 202 and 216.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method, the method comprising:
   attaching a first body of an untethered downhole tool to a wellbore tubular of a wellbore, wherein the first body comprises a tool for performing an action in the wellbore;
   attaching a second body of the untethered downhole tool to the wellbore tubular of the wellbore, wherein the first body is connected to the second body by a cable;
   detaching the second body from the wellbore tubular; and engaging a motor in one of the first body or the second body to modify a length of the cable between the first body and the second body.

2. The method of claim 1, wherein the tool comprises an acoustic receiver and the action comprises sensing an acoustic signal, and wherein the second body comprises an acoustic source for generating the acoustic signal.

3. The method of claim 1, wherein the tool comprises an electromagnetic receiver and the action comprises sensing an electromagnetic signal, and wherein the second body comprises an electromagnetic source for generating the electromagnetic signal.

4. The method of claim 1, wherein the tool comprises a measuring tool, and wherein the action comprises measuring a characteristic of the wellbore.

5. The method of claim 4, the method further comprising:
measuring the characteristic of the wellbore by the measuring tool when both the first body and the second body are attached to the wellbore.

6. The method of claim 4, wherein the characteristic of the wellbore is selected from a group consisting of: a salinity of a fluid in the wellbore, a fluid phase of a fluid in the wellbore, a fluid density of a fluid in the wellbore, a viscosity of a fluid in the wellbore, a chemical composition of a fluid in the wellbore, a hydrogen concentration of a fluid in the wellbore, a pH of a fluid in the wellbore, a conductivity of a fluid in the wellbore, a flow rate of a fluid in the wellbore, a casing diameter of the wellbore, a thickness of a casing of the wellbore, a corrosion rate of the wellbore, and a cement bonding strength in the wellbore.

7. The method of claim 4, wherein the characteristic of the wellbore is a property of a formation surrounding the wellbore, and wherein the property of the formation is selected from a group consisting of: a permittivity of the formation, and a permeability of the formation.

8. The method of claim 1, wherein engaging the motor in one of the first body or the second body to modify the length of the cable between the first body and the second body comprises:
rotating, by the motor, a spooler, wherein the motor rotates the spooler in a direction selected from a group consisting of: a first direction to decrease an amount of the cable on the spooler and increase the length of the cable between the first body and the second body, and a second direction to increase the amount of the cable on the spooler and decrease the length of the cable between the first body and the second body.

9. The method of claim 1, wherein:
attaching the first body to the wellbore tubular comprises activating a first magnetic anchor configured to selectably attach the first body to the wellbore;
attaching the second body to the wellbore tubular comprises activating a second magnetic anchor configured to selectably attach the second body to the wellbore; and
detaching the second body from the wellbore tubular comprises de-activating the second magnetic anchor, wherein the second magnetic anchor is further configured to selectably detach the second body from the wellbore.

10. The method of claim 9, wherein the first magnetic anchor comprises a first permanent magnet and a second permanent magnet connected in parallel between two ferromagnetic poles, with the first permanent magnet having a higher coercivity or resistance than the second permanent magnet, and wherein activating the first magnetic anchor comprises:
controlling a power source of the first body to provide power to a coil of the second permanent magnet;
generating an external flux in a first direction through the second permanent magnet; and
extending at least a portion of one or more magnetic field lines from the two ferromagnetic poles to attach to the wellbore tubular.

11. The method of claim 10, wherein the second magnetic anchor comprises a third permanent magnet and a fourth permanent magnet connected in parallel between two ferromagnetic poles, with the third permanent magnet having a higher coercivity or resistance than the fourth permanent magnet, and
wherein de-activating the second magnetic anchor comprises:
controlling a power source of the second body to provide power to the coil of the fourth permanent magnet;
generating the external flux in a second direction through the fourth permanent magnet; and
retaining a portion of the one or more magnetic field lines within the two ferromagnetic poles to detach from the wellbore tubular.

12. The method of claim 1, wherein at least one of the first body and the second body includes a detachable ballast, the method further comprising:
causing the detachable ballast to detach from the at the at least one of the first body and the second body, wherein a density of the at least one of the first body and the second body is altered.

13. The method of claim 1, wherein at least one of the first body and the second body includes a bladder and a pump, the method further comprising:
causing the pump to inflate the bladder, wherein a density of the at least one of the first body and the second body is altered.

14. The method of claim 1, the method further comprising:
repeatedly attaching and detaching both the first body and the second body of the untethered downhole tool to make a series of moves of the untethered tool in a direction along the wellbore; and
calculating a distance in the wellbore by accumulating each of the series of moves multiplied by a respective corresponding length of the cable between the first body and the second body for each of the series of moves.

15. The method of claim 14, wherein calculating the distance in the wellbore by accumulating each of the series of moves multiplied by a respective corresponding length of the cable between the first body and the second body for each of the series of moves comprises:
calculating an accumulation of spooled cable length or unspooled cable length.

16. The method of claim 14, the method further comprising:
correcting the distance in the wellbore using a casing collar locator.

17. The method of claim 14, the method further comprising:
when both the first body and the second body of the untethered downhole tool are attached to the wellbore tubular, using the tool for performing the action in the wellbore to take a measurement of a characteristic of the wellbore.

18. The method of claim 1, wherein the tool comprises a casing collar locator and the action comprises detecting a casing collar within the wellbore, the method further comprising:
   determining a depth of the untethered tool within the wellbore; and
   correcting the depth of the untethered tool based at least in part on a known depth of the casing collar.

19. The method of claim 1, wherein a first one of the first body or the second body of the untethered downhole comprises an acoustic source, and wherein a second one of the first body or the second body of the untethered downhole comprises an acoustic receiver.

20. The method of claim 1, wherein a first one of the first body or the second body of the untethered downhole comprises an electromagnetic source, and wherein a second one of the first body or the second body of the untethered downhole comprises an electromagnetic receiver.

21. The method of claim 1, wherein the tool for performing the action in the wellbore is configured to measure one or more characteristics selected from a group consisting of: a fluid phase, a fluid density and viscosity, a chemical composition, a hydrogen concentration, a pH level, a salinity, a conductivity, a flow rate, a casing diameter and thickness, a corrosion rate, a cement bonding strength, a formation properties such as permittivity, and permeability.

22. The method of claim 1, wherein the method further comprises:
   performing at least one of the following processes:
      modifying an effective density of the first body of the untethered downhole tool by dropping a ballast associated with the first body; and
      modifying an effective density of the second body of the untethered downhole tool by dropping a ballast associated with the second body.

23. An untethered downhole tool, comprising:
   a first body, comprising:
      a first housing that defines a first inner volume, and
      a first controllable magnetic anchor configured to selectably attach the first body to a wellbore tubular in a wellbore;
   a second body, the second body comprising:
      a second housing that defines a second inner volume, and
      a second controllable magnetic anchor configured to selectably attach the second body to the wellbore tubular in the wellbore;
   a tool disposed in one of the first inner volume or the second inner volume and configured to perform an action;
   a cable connecting the first body to the second body;
   a motor attached to one of the first body or the second body and configured to modify a length of the cable between the first body and the second body;
   at least one controller disposed in the first inner volume or the second inner volume and configured to control at least two of the first controllable magnetic anchor, the second controllable magnetic anchor, and the motor; and
   wherein the untethered downhole tool is configured for operation in the wellbore untethered to a surface of the wellbore.

24. The untethered downhole tool of claim 23, wherein the tool is disposed in the first inner volume and comprises an acoustic receiver and the action comprises sensing an acoustic signal, and wherein an acoustic source for generating the acoustic signal is disposed in the second inner volume.

25. The untethered downhole tool of claim 23, wherein the tool is disposed in the first inner volume and comprises an electromagnetic receiver and the action comprises sensing an electromagnetic signal, and wherein an electromagnetic source for generating the electromagnetic signal is disposed in the second inner volume.

26. The untethered downhole tool of claim 23, wherein the tool comprises a measuring tool, and wherein the action comprises measuring a characteristic of the wellbore selected from a group consisting of: a salinity of a fluid in the wellbore, a fluid phase of a fluid in the wellbore, a fluid density of a fluid in the wellbore, a viscosity of a fluid in the wellbore, a chemical composition of a fluid in the wellbore, a hydrogen concentration of a fluid in the wellbore, a pH of a fluid in the wellbore, a conductivity of a fluid in the wellbore, a flow rate of a fluid in the wellbore, a casing diameter of the wellbore, a thickness of a casing of the wellbore, a corrosion rate of the wellbore, a cement bonding strength in the wellbore, a permittivity of a formation surrounding the wellbore, and a permeability of a formation surrounding the wellbore.

27. The untethered downhole tool of claim 23, wherein the tool comprises a measuring tool and the action comprises measuring a characteristic of the wellbore, and wherein the at least one controller is configured to:
   cause the first controllable magnetic anchor to selectably attach the first body to the wellbore tubular in the wellbore;
   cause the second controllable magnetic anchor to selectably attach the second body to the wellbore tubular in the wellbore; and
   cause the measuring tool to measure the characteristic of the wellbore when both the first body is attached to the wellbore tubular and the second body is attached to the wellbore tubular.

* * * * *